(12) United States Patent
Yudanov et al.

(10) Patent No.: US 11,614,797 B2
(45) Date of Patent: Mar. 28, 2023

(54) RENDERING ENHANCEMENT BASED IN PART ON EYE TRACKING

(71) Applicant: Micron Technology, Inc., Boise, ID (US)

(72) Inventors: Dmitri Yudanov, Rancho Cordova, CA (US); Samuel E. Bradshaw, Sacramento, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/675,171

(22) Filed: Nov. 5, 2019

(65) Prior Publication Data

US 2021/0132690 A1    May 6, 2021

(51) Int. Cl.
| | |
|---|---|
| *G06F 3/01* | (2006.01) |
| *G06F 3/0482* | (2013.01) |
| *G06F 3/16* | (2006.01) |
| *G06F 3/0487* | (2013.01) |
| *G02B 27/01* | (2006.01) |
| *G06V 40/19* | (2022.01) |

(52) U.S. Cl.
CPC ......... *G06F 3/013* (2013.01); *G02B 27/0101* (2013.01); *G06F 3/017* (2013.01); *G06F 3/0487* (2013.01); *G06V 40/19* (2022.01)

(58) Field of Classification Search
None
See application file for complete search history.

(56) References Cited

U.S. PATENT DOCUMENTS

| | | | | |
|---|---|---|---|---|
| 6,659,611 | B2 * | 12/2003 | Amir | A61B 3/113 |
| | | | | 351/210 |
| 8,094,091 | B2 * | 1/2012 | Noma | G02B 27/017 |
| | | | | 345/7 |
| 8,423,076 | B2 * | 4/2013 | Kim | G06F 3/04847 |
| | | | | 345/157 |
| 8,754,831 | B2 * | 6/2014 | Kollin | G06F 3/011 |
| | | | | 345/32 |

(Continued)

FOREIGN PATENT DOCUMENTS

WO    2015094276    6/2015

OTHER PUBLICATIONS

International Search Report and Written Opinion, PCT/US2020/058690, dated Feb. 18, 2021.

(Continued)

*Primary Examiner* — Jordany Nunez
(74) *Attorney, Agent, or Firm* — Greenberg Traurig

(57) ABSTRACT

An apparatus having a computing device and a user interface—such as a user interface having a display that can provide a graphical user interface (GUI). The apparatus also includes a camera, and a processor in the computing device. The camera can be connected to the computing device and/or the user interface, and the camera can be configured to capture pupil location and/or eye movement of a user. The processor can be configured to: identify a visual focal point of the user relative to the user interface based on the captured pupil location, and/or identify a type of eye movement of the user (such as a saccade) based on the captured eye movement. The processor can also be configured to control parameters of the user interface based at least partially on the identified visual focal point and/or the identified type of eye movement.

22 Claims, 5 Drawing Sheets

(56) References Cited

U.S. PATENT DOCUMENTS

| | | | |
|---|---|---|---|
| 9,335,888 B2* | 5/2016 | Durham | G06F 3/0486 |
| 9,965,030 B2 | 5/2018 | Jeong | |
| 10,031,577 B2* | 7/2018 | McLean | G06F 3/1454 |
| 10,042,420 B2* | 8/2018 | McLean | G06F 3/165 |
| 10,303,250 B2 | 5/2019 | Jeong | |
| 10,303,341 B2* | 5/2019 | Mosqueda Mejia | G06F 3/013 |
| 10,394,320 B2* | 8/2019 | George-Svahn | G06F 3/014 |
| 10,930,042 B2* | 2/2021 | Dawson | G06T 11/60 |
| 10,976,816 B2* | 4/2021 | Wilson | G06T 19/20 |
| 10,984,756 B2* | 4/2021 | Tall | H04N 19/162 |
| 2002/0105482 A1* | 8/2002 | Lemelson | G06F 3/013 345/32 |
| 2003/0123027 A1* | 7/2003 | Amir | A61B 3/113 351/209 |
| 2007/0279591 A1* | 12/2007 | Wezowski | G06F 3/013 351/208 |
| 2009/0313584 A1* | 12/2009 | Kerr | G06F 3/012 715/849 |
| 2010/0064259 A1* | 3/2010 | Alexanderovitc | G06F 3/04815 715/852 |
| 2011/0001763 A1* | 1/2011 | Murakami | H04N 21/4223 345/661 |
| 2011/0170067 A1 | 7/2011 | Sato et al. | |
| 2011/0279393 A1 | 11/2011 | Okada et al. | |
| 2012/0036433 A1* | 2/2012 | Zimmer | G06F 3/0488 715/702 |
| 2012/0069002 A1 | 3/2012 | Kuribayashi et al. | |
| 2013/0321265 A1 | 12/2013 | Bychkov et al. | |
| 2013/0342676 A1 | 12/2013 | Amano et al. | |
| 2014/0267003 A1 | 9/2014 | Wang et al. | |
| 2014/0267005 A1 | 9/2014 | Urbach | |
| 2014/0333521 A1 | 11/2014 | Hwang | |
| 2014/0347265 A1* | 11/2014 | Aimone | A61B 5/6803 345/156 |
| 2014/0375558 A1* | 12/2014 | Conness | H04N 21/4223 345/156 |
| 2015/0221064 A1* | 8/2015 | Thomas | G06F 3/011 345/660 |
| 2015/0269907 A1 | 9/2015 | Hadas | |
| 2015/0309565 A1* | 10/2015 | Beri | G06F 3/013 715/776 |
| 2016/0034032 A1 | 2/2016 | Jeong | |
| 2016/0109947 A1* | 4/2016 | George-Svahn | G06F 3/04883 345/156 |
| 2016/0210503 A1 | 7/2016 | Yin et al. | |
| 2016/0377864 A1* | 12/2016 | Moran | G06F 3/011 345/8 |
| 2017/0097677 A1* | 4/2017 | McLean | G09G 5/12 |
| 2017/0139212 A1 | 5/2017 | Choi | |
| 2017/0177075 A1 | 6/2017 | Zhang | |
| 2017/0178001 A1 | 6/2017 | Anderson et al. | |
| 2017/0200296 A1 | 7/2017 | Jones et al. | |
| 2017/0330042 A1 | 11/2017 | Vaziri | |
| 2017/0344108 A1* | 11/2017 | Mosqueda Mejia | G06F 3/013 |
| 2018/0008141 A1 | 1/2018 | Krueger | |
| 2018/0224934 A1 | 8/2018 | Jeong | |
| 2018/0284451 A1* | 10/2018 | Eash | G06T 7/70 |
| 2019/0091565 A1* | 3/2019 | Nelson | G07F 17/3216 |
| 2019/0179425 A1 | 6/2019 | Seo et al. | |
| 2019/0235625 A1 | 8/2019 | Jeong | |
| 2020/0074724 A1 | 3/2020 | Mathur et al. | |
| 2020/0310117 A1 | 10/2020 | Qian et al. | |
| 2021/0041953 A1 | 2/2021 | Poltorak | |
| 2021/0116960 A1 | 4/2021 | Wang et al. | |
| 2021/0132689 A1 | 5/2021 | Yudanov et al. | |
| 2021/0165490 A1* | 6/2021 | Aimone | A61M 21/00 |
| 2021/0263309 A1 | 8/2021 | Rivera Cintron et al. | |

OTHER PUBLICATIONS

International Search Report and Written Opinion, PCT/US2020/058692, dated Feb. 22, 2021.

* cited by examiner

RENDERING ENHANCEMENT BASED IN PART ON EYE TRACKING

FIELD OF THE TECHNOLOGY

At least some embodiments disclosed herein relate to user interface control based in part on eye tracking. For example, at least some embodiments disclosed herein relate to graphical user interface rendering enhancement based in part on eye tracking.

BACKGROUND

Gesture recognition and control of computer software and hardware based on gesture recognition has become prominent. Gestures usually originate from a person's face or hand. An advantage of gesture recognition is that users can use gestures to control or interact with computing devices without physically touching them. An abundance of techniques exists, such as approaches using cameras and computer vision algorithms.

Also, touchless user interfaces are becoming more popular and such interfaces may depend on gesture recognition. A touchless user interface is an interface that relies on body part motion, gestures, and/or voice without user input through touching a keyboard, mouse, touchscreen, or the like. There are a number of applications and devices utilizing touchless user interfaces such as multimedia applications, games, smart speakers, smartphones, tablets, laptops, and the Internet of Things (IoT).

Sophisticated camera arrangements and simpler camera configurations can be used for capturing body part movement or location to use as input for gesture recognition via computer vision algorithms. Sophisticated camera arrangements can include depth-aware cameras and stereo cameras. Depth-aware cameras can generate a depth map of what is being seen through the camera, and can use this data to approximate three-dimensional (3D) representations of moving body parts. Stereo cameras can also be used in approximating 3D representations of moving body parts. Also, a simpler single camera arrangement can be used such as to capture two-dimensional (2D) representations of moving body parts. With more sophisticated software-based gesture recognition being developed, even a 2D digital camera can be used to capture images for robust detection of gestures.

A type of gesture recognition that is becoming more prevalent is eye gesture recognition. Eye gesture recognition can be implemented through eye tracking. Eye tracking can include measuring the point of gaze (where a person is looking) or the motion of an eye relative to the head. An eye tracker, which can use a camera for capturing images of eye movement or location, is a device for measuring eye positions and eye movement or location. Eye trackers can be used in research on eye physiology and functioning, in psychology, and in marketing. Also, eye trackers can be used in general as an input device for human-computer interaction. In recent years, the increased sophistication and accessibility of eye-tracking technologies has generated interest in the commercial sector. Also, applications of eye tracking include human-computer interaction for use of the Internet, automotive information systems, and hands-free access to multi-media.

There are many ways to measure eye movement or location. One general way is to use still or video images from which the eye position or orientation is extracted. And, the resulting data from image analysis can be statistically analyzed and graphically rendered to provide evidence of specific visual patterns. By identifying fixations, saccades, pupil dilation, blinks and a variety of other eye behaviors, human-computer interaction can be implemented. And, by examining such patterns, researchers can determine effectiveness of a medium or product.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
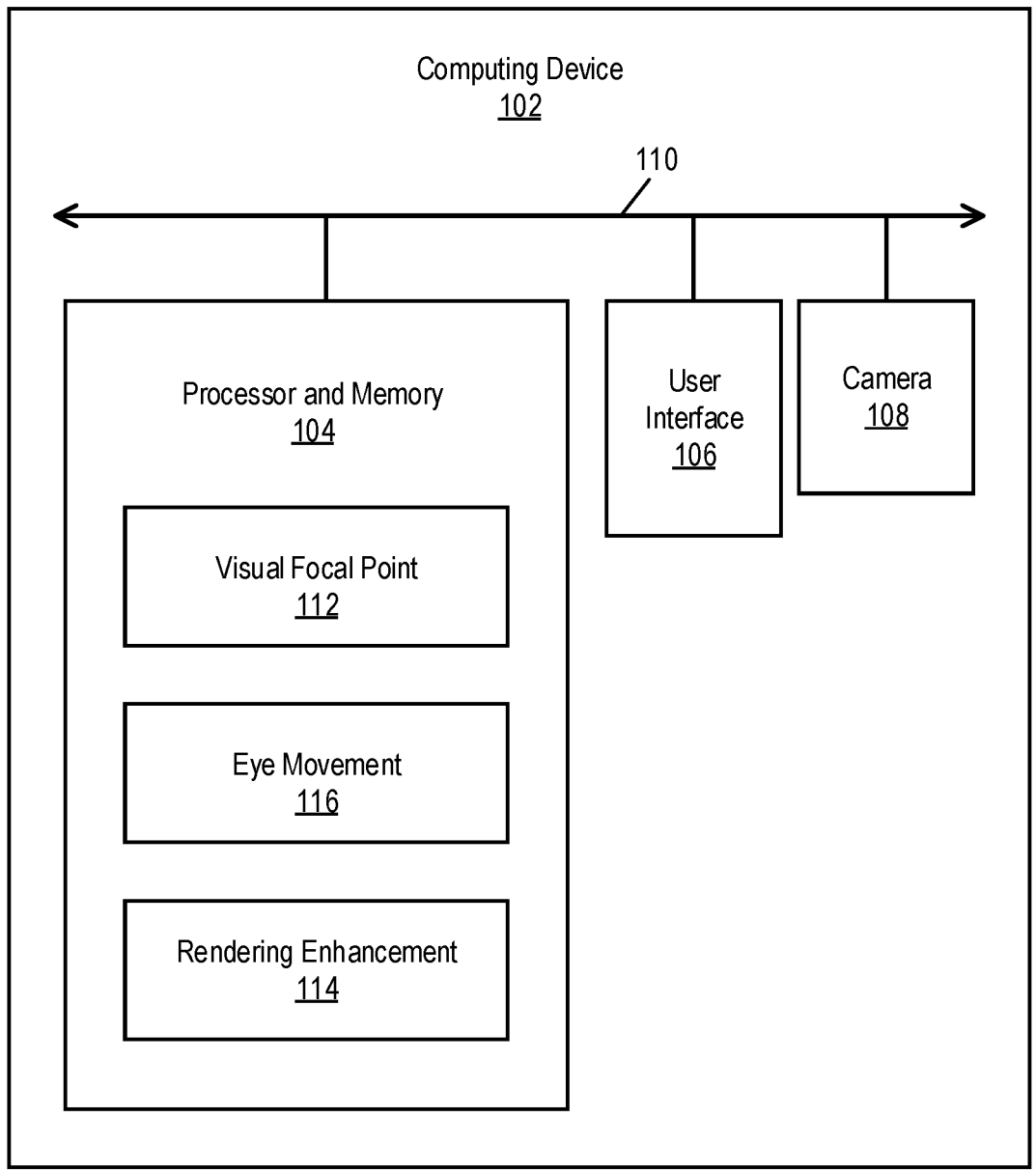
FIG. 1 illustrates an example computing device configured to implement user interface control (such as rendering enhancement) based in part on eye tracking, in accordance with some embodiments of the present disclosure.

At least some embodiments disclosed herein relate to user interface control, such as graphical user interface (GUI) rendering enhancement, based in part on eye tracking. More particularly, at least some embodiments disclosed herein relate to control of one or more parameters of a display and/or a GUI based in part on eye tracking. Also, it is to be understood that some embodiments disclosed herein relate to control of one or more parameters of one or more user interfaces in general, based in part on eye tracking. For example, some embodiments disclosed herein relate to control of parameters of an auditory user interface or a tactile user interface. Parameters of an auditory user interface can include volume, playback speed, etc. Parameters of a tactile user interface can include pattern of vibration, strength of vibration, an outputted temperature, an outputted scent, etc. Embodiments described herein can include controlling parameters of any type of user interface (UI), including tactile UI (touch), visual UI (sight), auditory UI (sound), olfactory UI (smell), equilibria UI (balance), and gustatory UI (taste).

At least some embodiments are directed to an apparatus having a computing device and a user interface—such as a user interface having a display that can provide a GUI. The apparatus also includes a camera, and a processor in the computing device. The camera can be connected to at least one of the computing device, the user interface, or a combination thereof, and the camera can be configured to capture pupil location and/or eye movement of a user. And, the processor can be configured to identify a visual focal point of the user relative to the user interface based on the captured pupil location. The processor can also be configured to identify a type of eye movement of the user (such as a saccade) based on the captured eye movement of the user. The processor can also be configured to control one or more parameters of the user interface based at least partially on the identified visual focal point of the user and/or the identified type of eye movement.

At least some embodiments are directed to a camera that is used to track eyes of a user to determine a visual focal point of the user relative to a screen of a user interface. The screen can be located at a certain angle and/or distance relative to the visual focal point of the user. The angle and/or distance can change as the user moves the device in space. Once a computing device connected to the camera locates the user eyes and determines the angle and/or distance, the device can determine when user saccades and when eyes move from one screen point to another. Also, other eye movement can be captured by the camera and can be used by the device to determine user saccades or other types of eye movement.

When using the viewing angle and distance, the device can render a screen of a user interface to best render and present images or video for enhanced user experience. For example, the device can skew the screen output and/or non-uniformly distribute screen resolution, coloring, shading, brightness, contrast, or the like to accommodate the viewing angle and distance of the user's eyes relative to the screen. Further, the device can apply filters. And, the device can adjust other user interface elements of the user interface such as adjust tactile UI, visual UI, auditory UI, olfactory UI, equilibria UI, and/or gustatory UI elements. Furthermore, in some embodiments, the controlling of one or more parameters of the display can include rendering images or video with maximized invariance in quality of picture for the user in presence of disturbance. Invariance can include invariance to any disturbance, such as shaking, vibration, noise and other things that make the visual connection between the eyes and screen weak or broken. Also, for example, the screen output of the device can be invariant to external disturbance by adapting and reinforcing a visual connection between the eyes and screen, by making screen output stable with respect to any disturbance to the screen. This way the user can consistently and continuously receive undisturbed or less disturbed content. For example, this can be done by keeping the screen output at least partly constant in a coordinate system relative to the eyes of the user. This can be especially useful for a cap and visor embodiment, where the visor provides the screen. The cap and visor are expected to vibrate and move when worn (especially when the user is participating in some form of exercise or a sport).

In general, at least some embodiments are directed to capturing eye movement, location, and/or orientation and interpreting such things to control operation of a user interface of an application or a computing device (such as a mobile device or an IoT device).

In some embodiments, an apparatus can include a computing device, a display, a camera, and a processor that is in the computing device. The display can be connected to the computing device, and the display can be configured to provide a GUI. The camera can be connected to at least one of the computing device, the display, or a combination thereof, and the camera can be configured to capture pupil location of a user. The processor in the computing device can be configured to identify a visual focal point of the user relative to the GUI based on the captured pupil location. The processor can also be configured to control one or more parameters of the display, the GUI, or a combination thereof based at least partially on the identified visual focal point of the user.

The processor can be configured to identify the visual focal point of the user based at least partially on viewing angle and distance of at least one pupil of the user relative to the GUI. In such embodiments, the processor can also be configured to control skew or angle of output of the display based at least partially on the identified visual focal point of the user. Also, the processor can be configured to control distribution of screen resolution of the display based at least partially on the identified visual focal point of the user. Also, the processor can be configured to control distribution of screen coloring of the display based at least partially on the identified visual focal point of the user. Also, the processor can be configured to control distribution of screen brightness of the display based at least partially on the identified visual focal point of the user. Also, the processor can be configured to control distribution of screen shading of the display based at least partially on the identified visual focal point of the user. Also, the processor can be configured to control distribution of screen contrast of the display based at least partially on the identified visual focal point of the user.

Also, the camera can be configured to capture eye movement of the user, and the processor can be configured to identify a saccade based on the captured eye movement of the user as well as further control the one or more parameters of the display, the GUI, or a combination thereof based at least partially on the identified saccade. In such embodiments, the processor can be configured to approximate eye movement of the user from one focal point to another focal point according to the identified saccade. And, the processor can be configured to further control the one or more parameters of the display, the GUI, or a combination thereof based at least partially on the identified approximated eye movement. Also, the processor can be configured to further change skew or angle of output of the display based at least partially on the identified saccade. Also, the processor can be configured to further non-uniformly distribute screen resolution of the display based at least partially on the identified saccade. Also, the processor can be configured to further non-uniformly distribute coloring of the display based at least partially on the identified saccade. Also, the processor can be configured to further non-uniformly distribute either brightness or shading of the display based at least partially on the identified saccade. Also, the processor can be configured to further non-uniformly distribute contrast of the display based at least partially on the identified saccade.

The apparatus can also include a wearable structure. The wearable structure can include or be connected to at least one of the computing device, the display, the camera, or a combination thereof. The wearable structure can be configured to be worn on a head, around a neck, or around a wrist or forearm of the user. The wearable structure can include either a cap, a wristband, a neck strap, a necklace, or a contact lens. Also, it is to be understood that the apparatus can include other structures besides wearable structures. For example, the apparatus can include or be part of an appliance (such as a smart appliance with a display) or television set (such as an enhanced LCD or OLED TV). Also, 4K TV or a TV with a higher screen resolution can benefit from the rendering enhancement. Also, GPU vendors that provide high end devices for gaming can benefit from the rendering enhancement.

In some embodiments, the apparatus can include a computing device with a display configured to provide a GUI, a camera in or attached to the computing device configured to capture pupil location and eye movement of a user, and a processor in the computing device. In such examples, the processor can be configured to identify a visual focal point of the user relative to a screen of the display based on viewing angle and distance of at least one pupil of the user relative to the screen. Also, in such examples, the processor can be configured to identify a saccade based on the captured eye movement of the user. The processor can also be configured to control the one or more parameters of the display, the GUI, or a combination thereof based on the identified saccade, the identified visual focal point, or a combination thereof.

In some embodiments, the apparatus can include a computing device with a display configured to provide a GUI, a camera in or attached to the computing device configured to capture pupil location and eye movement of a user, and a processor in the computing device. The processor can be configured to identify a visual focal point of the user relative to a screen of the display based on the captured pupil location. The processor can also be configured to identify a saccade based on the captured eye movement of the user, and control the one or more parameters of the display, the GUI, or a combination thereof based on the identified saccade, the identified visual focal point, or a combination thereof.

In some embodiments, the camera can be integrated with a wearable device or structure (e.g., a smart watch or a head-mounted device that is part of a hat). And, with such an example, a user can control one or more parameters of a user interface (e.g., control dimming or turning off of a display or control audio or tactile output of a user interface) by moving the focal point of the eye away from a certain object such as the user interface. Also, for example, the user can look at a point in a display; and the point can be zoomed in or focused on by a GUI in the display if a user makes a blink or another eye gesture. Or, for example, more audio information can be provided to a user regarding information at the point after a user makes a blink or another eye gesture. And, these are just some of the many examples of the human-computer interaction via the eye movement tracking disclosed herein. Also, the wearable device can interact with a user's tablet or smartphone or IoT device. In some embodiments, the camera, the computing device, and the display or other type of user interface can be separated and connected over a communications network such as a local wireless network or a wide-area network or local to device network such as Bluetooth or the like.

At least some embodiments can include a camera that is used to capture the eye movement of the user (e.g., saccades, smooth pursuit movements, vergence movements, vestibulo-ocular movements, eye attention, angle, point of view, etc.). The eye movement can be interpreted as an eye gesture by a processor (such as a CPU) to control the operation of a user interface connected to the processor. For example, the rendering of content on a displayed or projected screen can be controlled by the eye gesture.

The camera can be integrated within a head-mountable user interface (such as a head-mountable display). The user interface can deliver content into the user eyes and ears, such as 3D virtual reality content with audio, or augmented reality content with visible (e.g., graphical), tactile, and/or audible content. For example, the user may control the dimming or turning off of a display, or the presentation of content, by moving the focal point of an eye away from a provided point of interest. For example, when the eyes of the user are looking away or looking elsewhere, the device can dim, lower volume, exclude tactile or haptic feedback, or turn off to save power. For example, the user may look at a point; and then the point can be zoomed in if a user makes a blink or another eye gesture.

The user interface and camera can be included with a watch or a cap (or hat), for example. A cap or a watch can include a small embedded camera that can monitor user's eyes and can communicate with a smartphone or another type of device. With a cap, the cap can have a flexible screen embedded in a visor of the cap, or can have a transparent screen that can move up or down from the visor. Such examples are just a few of the many embodiments and implementations of the combination of the computing device, the user interface, the camera, and the wearable structure.

In some embodiments disclosed herein, the apparatus can have a wearable structure, the computing device, the user interface, and the camera. The wearable structure can be configured to be worn by a user and can be connected to at least one of the computing device, the user interface, the camera, or a combination thereof. The wearable structure can be, include, or be a part of a hat, cap, wristband, neck strap, necklace, contact lenses, glasses, or another type of eyewear. In some embodiments, the wearable structure can be, include, or be a part of a cap and the cap can have a visor, and the display can be a part of the cap with the visor.

Although many examples refer to control of a display or GUI, there are many ways to implement the embodiments described herein including many different ways to control many different types of user interfaces.

Some embodiments can be or include the apparatus having a cap and the cap can have a visor. The display can be positioned to face downward from a bottom surface of the visor or positioned in the visor to move downward and upward from the bottom surface of the visor. The computing device can be attached to the cap. And, the camera can be in or connected to the computing device and configured to capture eye movement of the user when the camera is facing a face of the user or when eyes in the camera's detection range. A processor in the computing device can be configured to identify one or more eye gestures from the captured eye movement. The processor can also be configured to control one or more parameters of a display or a GUI of a second computing device wirelessly connected to the computing device, based on the identified one or more eye gestures. Also, the processor can be configured to control one or more parameters of a display or a GUI of the computing device based on the identified one or more eye gestures.

Another example of some of the many embodiments can include the apparatus having a wristband. The computing device can include the display. And, the computing device can be attached to the wristband. The display can be configured to provide a GUI. The camera in the computing device can be configured to capture eye movement of the user when the display is facing a face of the user. A processor in the computing device can be configured to identify one or more eye gestures from the captured eye movement and control one or more parameters of the display or the GUI based on the identified one or more eye gestures.

FIG. 1 illustrates an example computing device 102 including a processor, memory (e.g., see processor and memory 104), a user interface 106, and a camera 108. The computing device 102 can be configured to implement user interface control (such as GUI rendering enhancement) based in part on eye tracking, in accordance with some embodiments of the present disclosure. As shown, the computing device 102 includes the processor and memory 104, the user interface 106, and the camera 108. The processor and memory 104, the user interface 106, and the camera 108 are communicatively coupled via a bus 110 within the computing device 102.

Figure 3:
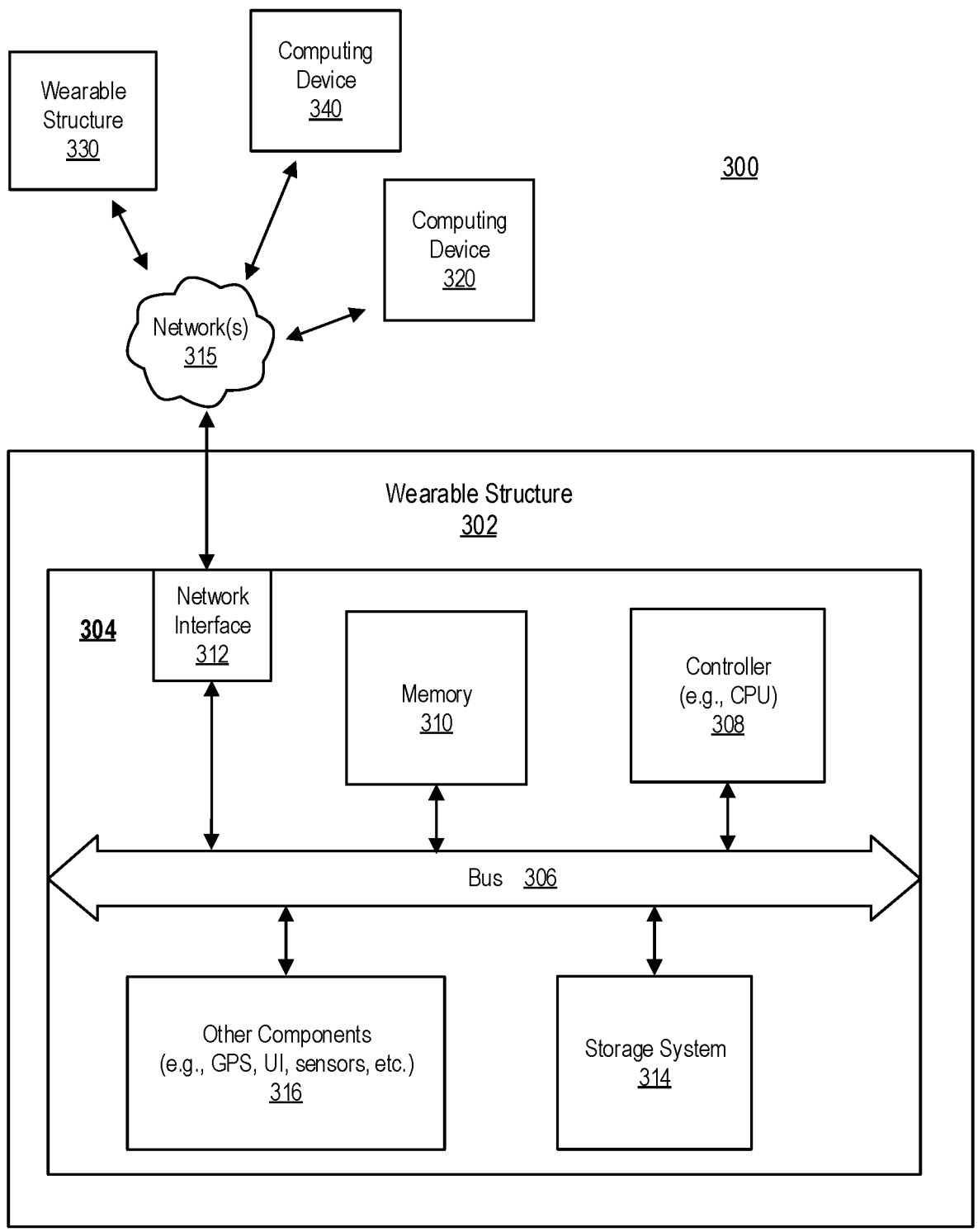

Although not depicted in FIG. 1, the computing device 102 can be, be a part of, or include a wearable structure that is configured to be worn by a user (e.g., see wearable structure 302 shown in FIG. 3). An apparatus including the computing device 102 can also include a wearable structure. The wearable structure can include or be connected to at least one of the computing device 102, the processor and memory 104, the user interface 106 (which can be or include a display), the camera 108, or a combination thereof. The wearable structure can be configured to be worn on a head, around a neck, or around a wrist or forearm of the user. The wearable structure can include either a cap, a wristband, a neck strap, a necklace, or a contact lens.

The user interface 106 can be configured to provide a visual user interface (such as a GUI), a tactile user interface, an auditory user interface, any other type of user interface, or any combination thereof. For example, the user interface 106 can be or include a display connected to at least one of the processor and memory 104, the camera 108 or a combination thereof, and the display can be configured to provide a GUI. Also, the user interface 106 can be or include a projector, one or more audio output devices such as speakers, and/or one or more tactile output devices such as vibrating devices. And, such components can be connected to at least one of the processor and memory 104, the camera 108 or a combination thereof. Also, embodiments described herein can include one or more user interfaces of any type, including tactile UI (touch), visual UI (sight), auditory UI (sound), olfactory UI (smell), equilibria UI (balance), and gustatory UI (taste). Embodiments described herein can also include neural- or brain-computer interfaces, where neurons are wired with electrodes inside or outside the human body, and where the interfaces are connected to external devices wirelessly or in a wired way.

The camera 108 can be connected to at least one of the processor and memory 104, the user interface 106, or a combination thereof, and the camera can be configured to capture pupil location of a user and/or eye movement of a user. The camera 108 can also be configured to capture locations of other parts of the eye. In some examples, in embodiments where the user interface is or includes a display, the camera can be in or connected to the computing device and/or the display and can be configured to capture pupil location of a user and/or eye movement of a user when the display is facing a face of the user or when eyes in the camera's detection range.

The camera 108 can be, include, or be a part of a sophisticated camera arrangement or a simpler camera configuration. And, the camera 108 can capture eye movement to use as input for identification of visual focal point, identification of a type of eye movement, and/or gesture recognition via one or more computer vision algorithms. A sophisticated camera arrangement can include one or more depth-aware cameras and two or more stereo cameras. Depth-aware cameras can generate a depth map of what is being seen through the camera, and can use this data to approximate 3D representations of moving parts of a user's eyes or face. Stereo cameras can also be used in approximating 3D representations of moving parts of the eyes or face. Also, a simpler single camera arrangement, such as a single digital camera, can be used to capture 2D representations of moving parts of a user's eyes or face.

In some embodiments, the camera 108 can be configured to capture eye movement, location, and/or orientation and the processor of the processor and memory 104 can be configured to be executed instructions stored in the memory of the processor and memory 104 to interpret the captured eye movement, location, and/or orientation to control operation of the user interface 106. The computing device 102, in such embodiments, can be, be a part of, or include a mobile device, an IoT device, or any other type of device that can include such a camera, user interface, and processor and memory as shown in FIG. 1.

In some embodiments, an apparatus can include the computing device 102, a display (which is part of the user interface 106), the camera 108, and a processor that is in the computing device (e.g., see processor and memory 104). The display can be connected to the computing device 102 in some cases, or be a part of the computing device, or even include the computing device in some examples. And, the display can be configured to provide a GUI. The camera 108 can be connected to at least one of the computing device 102, the display, or a combination thereof, and the camera can be configured to capture pupil location of a user.

The processor of the processor and memory 104, in the computing device 102, can be configured to identify a visual focal point of the user relative to the GUI based on the captured pupil location that is captured by the camera 108. The processor can be configured to execute a visual focal point module 112 that is included in instructions stored in the memory of processor and memory 104. The execution of the visual focal point module 112 can cause the processor to identify a visual focal point of the user relative to the GUI based on the captured pupil location that is captured by the camera.

The processor of the processor and memory 104 can be configured to identify the visual focal point of the user based at least partially on viewing angle and distance of at least one pupil of the user relative to the GUI. The viewing angle and distance of at least one pupil of the user relative to the GUI can be captured by the camera 108. The processor can be configured to execute the visual focal point module 112 to cause the processor to identify the visual focal point of the user based at least partially on viewing angle and distance of at least one pupil of the user relative to the GUI. Also, in such embodiments, the processor can also be configured to control skew or angle of output of the display based at least partially on the identified visual focal point of the user.

The processor of the processor and memory 104 can be configured to control one or more parameters of the display, the GUI, or a combination thereof based at least partially on the identified visual focal point of the user. The processor can be configured to execute a rendering enhancement module 114 that is included in instructions stored in the memory of processor and memory 104. The execution of the rendering enhancement module 114 can cause the processor to control one or more parameters of the display, the GUI, or a combination thereof based at least partially on the identified visual focal point of the user. In some embodiments, rendering enhancement described herein can be used by an operating system and/or an application for control and enhanced user experience. For example, gaming applications can benefit from their own additional rendering enhancement.

Also, the processor of the processor and memory 104 can be configured to control distribution of screen resolution of the display based at least partially on the identified visual focal point of the user. The processor can be configured to execute the rendering enhancement module 114 to cause the processor to control distribution of screen resolution of the display based at least partially on the identified visual focal point of the user. In some embodiments, the processor can render finer resolution at the spot where eyes of the user are looking at in the screen and provide a smooth gradient towards the other areas of the screen. In such examples, when the eyes move their viewpoint on the screen the center of distribution also moves with the viewpoint providing superb experience of visual perception. Such distribution naturally fits a human vision apparatus. The benefit of this is not only enhanced visual experience but also reduced power and resource usage because the processor renders less according to the gradient. Also, the processor of the processor and memory 104 can be configured to control distribution of screen coloring of the display based at least partially on the identified visual focal point of the user. The processor can be configured to execute the rendering enhancement module 114 to cause the processor to control distribution of screen coloring of the display based at least partially on the identified visual focal point of the user. Also, the processor of the processor and memory 104 can be configured to control distribution of screen brightness of the display based at least partially on the identified visual focal point of the user. The processor can be configured to execute the rendering enhancement module 114 to cause the processor to control distribution of screen brightness of the display based at least partially on the identified visual focal point of the user. Also, the processor of the processor and memory 104 can be configured to control distribution of screen shading of the display based at least partially on the identified visual focal point of the user. The processor can be configured to execute the rendering enhancement module 114 to cause the processor to control distribution of screen shading of the display based at least partially on the identified visual focal point of the user. Also, the processor of the processor and memory 104 can be configured to control distribution of screen contrast of the display based at least partially on the identified visual focal point of the user. The processor can be configured to execute the rendering enhancement module 114 to cause the processor to control distribution of screen contrast of the display based at least partially on the identified visual focal point of the user.

In some embodiments, the camera 108 can be configured to capture eye movement of the user, and the processor of the processor and memory 104 can be configured to identify a type of eye movement (e.g., a saccade) based on the captured eye movement of the user as well as further control the one or more parameters of the display, the GUI, or a combination thereof based at least partially on the identified type of eye movement. The processor can be configured to execute an eye movement module 116 that is included in instructions stored in the memory of processor and memory 104. The execution of the eye movement module 116 can cause the processor to identify a type of eye movement (e.g., a saccade) based on the captured eye movement of the user. And, the processor can be configured to execute the rendering enhancement module 114 to cause the processor to control the one or more parameters of the display, the GUI, or a combination thereof based at least partially on the identified type of eye movement.

In such embodiments, the processor of the processor and memory 104 can be configured to approximate eye movement of the user from one focal point to another focal point according to the identified type of eye movement (e.g., identified saccade). Also, the processor can be configured to execute the eye movement module 116 to cause the processor to approximate eye movement of the user from one focal point to another focal point according to the identified type of eye movement. And, the processor can be configured to control the one or more parameters of the display, the GUI, or a combination thereof based at least partially on the identified approximated eye movement. The processor can also be configured to execute the rendering enhancement module 114 to cause the processor to further control the one or more parameters of the display, the GUI, or a combination thereof based at least partially on the identified approximated eye movement. In some embodiments, during eye movement with approximated trajectory, the rendering enhancement module 114 can decrease screen resolution unnoticeably to the eyes, which results in less usage of processing and memory resources and saves power for a mobile wearable device. Upon completion of such eye movement, the rendering enhancement module 114 restores resolution.

Also, the processor of the processor and memory 104 can be configured to further change skew or angle of output of the display based at least partially on the identified type of eye movement (e.g., identified saccade). The processor can be configured to execute the rendering enhancement module 114 to cause the processor to change skew or angle of output of the display based at least partially on the identified type of eye movement. The processor can be configured to execute the rendering enhancement module 114 to cause the processor to further non-uniformly distribute screen resolution of the display based at least partially on the identified type of eye movement. Also, the processor can be configured to execute the rendering enhancement module 114 to cause the processor to further non-uniformly distribute coloring of the display based at least partially on the identified type of eye movement. Also, the processor can be configured to execute the rendering enhancement module 114 to cause the processor to further non-uniformly distribute either brightness or shading of the display based at least partially on the identified type of eye movement. Also, the processor can be configured to execute the rendering enhancement module 114 to cause the processor to further non-uniformly distribute contrast of the display based at least partially on the identified type of eye movement.

In general, the examples of identifying of the visual focal point or the eye movement described herein and then the examples of subsequent control of one or more parameters of the user interface according to the identified visual focal point or the identified eye movement described herein can be implemented through an operating system of a device, another software application, and/or firmware, as well as programmable logic such as a field programmable gate array (FPGA) or an application specific integrated circuit (ASIC). In some embodiments, the visual focal point module 112, the rendering enhancement module 114, and the eye movement module 116 each can be implemented through an operating system of the computing device 102, another software application runnable in the computing device, and/or firmware in the computing device.

In general, wearable structures described herein can each be considered multiple wearable structures. Computing devices described herein can each be considered multiple computing devices. User interfaces described herein can each be considered multiple user interfaces, and cameras described herein can each be considered multiple cameras. Such components can be part of an ecosystem controllable through eye tracking, such as through identified visual focal points and/or identified eye movement.

Also, in general, the parts of the computing devices and apparatuses described herein can be connected to each other wirelessly or through wires or other types of communicative couplings.

Figure 2:
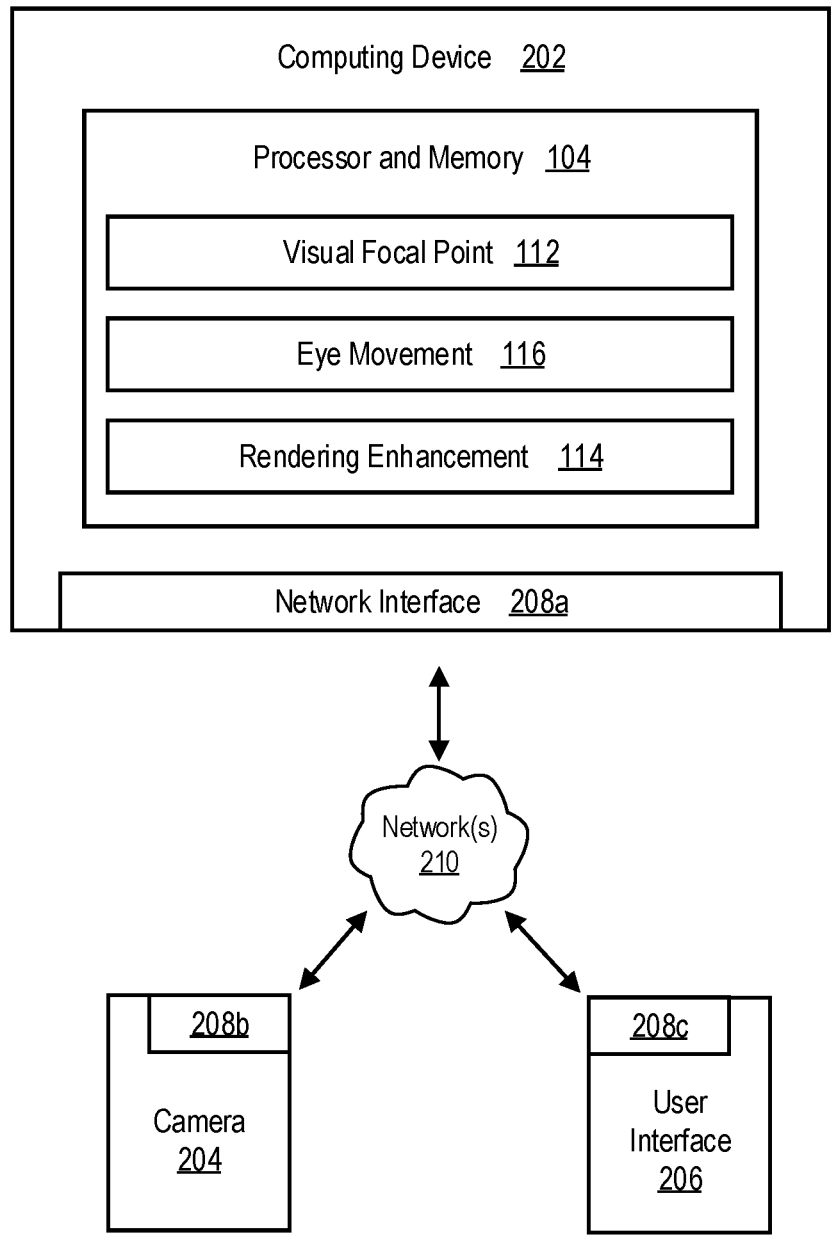
FIGS. 2 and 3 illustrate example networked systems each configured to implement user interface control (such as rendering enhancement) based in part on eye tracking, in accordance with some embodiments of the present disclosure.

FIGS. 2 and 3 illustrate example networked systems 200 and 300 each configured to implement user interface control (such as GUI rendering enhancement) based in part on eye tracking, in accordance with some embodiments of the present disclosure. Both of the networked systems 200 and 300 are networked via one or more communication networks. Communication networks described herein can include at least a local to device network such as Bluetooth or the like, a wide area network (WAN), a local area network (LAN), the Intranet, a mobile wireless network such as 4G or 5G, an extranet, the Internet, and/or any combination thereof. The networked systems 200 and 300 can each be a part of a peer-to-peer network, a client-server network, a cloud computing environment, or the like. Also, any of the apparatuses, computing devices, wearable structures, cameras, and/or user interfaces described herein can include a computer system of some sort. And, such a computer system can include a network interface to other devices in a LAN, an intranet, an extranet, and/or the Internet (e.g., see network(s) 210 and 315). The computer system can also operate in the capacity of a server or a client machine in client-server network environment, as a peer machine in a peer-to-peer (or distributed) network environment, or as a server or a client machine in a cloud computing infrastructure or environment.

Also, at least some of the illustrated components of FIGS. 2 and 3 can be similar to the illustrated components of FIG. 1 functionally and/or structurally and at least some of the illustrated components of FIG. 1 can be similar to the illustrated components of FIGS. 2 and 3 functionally and/or structurally. For example, for the most part, the computing devices 202 and 304 can each have similar features and/or functionality as the computing device 102, and vice versa. The user interface 206 and the user interface of the other components 316 can have similar features and/or functionality as the user interface 106, and vice versa. The camera 204 and a camera of the other components 316 each can have similar features and/or functionality as the camera 108, and vice versa. The controller 308 can have similar features and/or functionality as the processor of processor and memory 104. The bus 306 can have similar features and/or functionality as the bus 110, and vice versa. And, network interface 312 can have similar features and/or functionality as the network interfaces 208a, 208b, and 208c, and vice versa.

As shown in FIG. 2, the networked system 200 includes a computing device 202, a camera 204, and a user interface 206. The networked system 200 also includes the processor and memory 104 (which is part of the computing device 202). The bus of the computing device 202 is not shown in FIG. 2, but it connects at least the processor and memory 104 in device 202 to the network interface 208a. Also, it is to be understood that although the computing device 202, camera 204, and user interface 206 are not shown in or attached to a wearable structure, each one of the components or a combination thereof can be a part of or attached to a wearable structure. A wearable structure described herein can be configured to be worn by a user. The wearable structure can be, include, or be a part of a hat, cap, wristband, neck strap, necklace, other type of jewelry such as ring, contact lenses, glasses, another type of eyewear, any type of clothing such as a shirt, pants, a belt, shoes, a skirt, a dress, or a jacket, as well as a ring, a piercing, artificial nails and lashes, tattoos, makeup, etc. In some embodiments, a wearable structure can be a part of or implanted in human body, interfaced with nervous system providing all sorts of user experiences.

The network interface 208a (included in the computing device 202) connects the computing device to the camera 204 and the user interface 206, via one or more computer networks 210 and the network interfaces 208b and 208c respectively. The network interface 208b (included in the camera 204) connects the camera to the computing device 202 and the user interface 206, via network(s) 210 and the network interfaces 208a and 208c respectively. The network interface 208c (included in the user interface 206) connects the user interface to the computing device 202 and the camera 204, via network(s) 210 and the network interfaces 208a and 208b respectively.

The user interface 206 can be configured to provide a GUI, a tactile user interface, an auditory user interface, or any combination thereof. For example, the user interface 206 can be or include a display connected to at least one of the wearable structure (not depicted), the computing device 202, the camera 204 or a combination thereof via the network(s) 210, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

The camera 204 can be connected to at least one of the wearable structure (not depicted), the computing device 202, the user interface 206, or a combination thereof via the network(s) 210, and the camera can be configured to capture eye movement of the user and/or pupil location of the user. The camera 204 can also be configured to capture locations of other parts of the eye. Regarding capturing of eye movement of the user, the camera 204 (as well as the camera 108 shown in FIG. 1) can be configured to capture saccades, smooth pursuit movements, vergence movements, vestibulo-ocular movements, eye attention, angle, point of view, etc.

The processor of processor and memory 104 in the computing device 202, as shown in FIG. 2, can be configured to identify a visual focal point of the user relative to the GUI based on the captured pupil location captured by the camera 204. The processor can also be configured to control one or more parameters of the display, the GUI, or a combination thereof based at least partially on the identified visual focal point of the user. The processor can also be configured to identify one or more eye gestures from the captured eye movement captured by the camera 204. The processor can also be configured to control one or more parameters of the user interface 206 based on the identified one or more eye gestures and/or the identified visual focal point of the user. For example, the processor can also be configured to control one or more parameters of a display of the user interface 206, or a GUI of the user interface, or a combination thereof based on the identified one or more eye gestures and/or the identified visual focal point. Also, embodiments described herein can include the processor controlling parameters of any type of user interface (UI), including tactile UI (touch), visual UI (sight), auditory UI (sound), olfactory UI (smell), equilibria UI (balance), and gustatory UI (taste), based on the identified one or more eye gestures.

FIG. 3 illustrates an example networked system 300 that can implement user interface control (such as rendering enhancement) based in part on eye tracking for multiple user interfaces of multiple wearable structures and computing devices (e.g., see wearable structures 302 and 330 as well as computing devices 304, 320, and 340), in accordance with some embodiments of the present disclosure.

The wearable structure 302 as well as the other wearable structures described herein can be, include, or be a part of a hat, cap, wristband, neck strap, necklace, contact lenses, glasses, or another type of eyewear. For example, the wearable structure can include a cap with a visor, and the user interface can be a part of a cap with a visor. In such examples, the user interface can include a display that is part of the visor. And, the user interface in the cap can include audio output such as speakers or audio input such as a microphone. The display can be positioned to face downward from a bottom surface of the visor or positioned in the visor to move downward and upward from the bottom surface of the visor to be displayed in front of the eyes of the user when the cap is worn with the visor facing forward relative to the user. The speakers can be positioned in the cap proximate to a user's ears when the cap is facing forward with the visor in front of the user. The microphone when included can be anywhere in the cap.

Also, for example, the wearable structure 302 can be or include eyewear (such as glasses or contact lenses) that can provide content to a user when the user is wearing the eyewear, such as the content being provided via the lens of the eyewear. The content can be communicated to the eyewear wirelessly and be received by one or more antennas in the eyewear. In examples where the eyewear includes contact lenses, the contact lenses can each include a microscopic antenna that can receive communications with content to be displayed within the contact lens for user perception of the content. In examples where the eyewear includes glasses, the frame of the glasses can include small speakers and a microphone. Also, a small vibrating device can be included in the glasses for tactile output. Another way to communicate content is via light waveguides by projecting a video light stream at waveguide input, and distributing it inside the eyewear using nano-waveguides.

There are many types of wearable structures that can be used in embodiments. For example, any one of the components of the computing device 304 could be integrated into a hair piece or hair accessory instead of a hat or cap. In other words, the wearable structure 302 can be or include a hair piece or a hair accessory. Also, the wearable structure 302 can include or be a wristband, a neck strap, a necklace, or any type of jewelry. The wearable structure 302 can also include or be any type of clothing such as a shirt, pants, a belt, shoes, a skirt, a dress, or a jacket.

FIG. 3 also illustrates several components of the computing device 304. The computing device 304 can also include components similar to the components described herein for the computing devices 102 and 202. And, FIG. 3 also shows an example wearable structure 302 that includes the computing device 304. As shown, the multiple wearable structures and computing devices (e.g., see wearable structures 302 and 330 as well as computing devices 304, 320, and 340) can communicate with each other through one or more communications networks 315.

The computing device 304, which is included in the wearable structure 302, can be or include or be a part of the components in the computing device 102 shown in FIG. 1 or any type of computing device that is or is somewhat similar to a computing device described herein. The computing device 304 can be or include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing device 304 can be connected to communications network(s) 315 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the computing or mobile devices described herein (such as computing devices 102, 202, and 304) can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the computing device 304 shown in FIG. 3 as well as the computing devices 102 and 202 shown in FIGS. 1 and 2 respectively, the term "machine" shall also be taken to include any collection of machines that individually or jointly execute a set (or multiple sets) of instructions to perform any one or more of the methodologies or operations discussed herein. And, each of the illustrated computing or mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the example computing device 304, in accordance with some embodiments of the present disclosure. The computing device 304 can be communicatively coupled to the network(s) 315 as shown. The computing device 304 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors as well as a camera). The other components 316 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The computing device 304 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of computing device 304 that has a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 312) to other machines in a LAN, an intranet, an extranet, and/or the Internet (e.g., network(s) 315). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, programmable logic such as a FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 315).

The data storage system 314 can include a machine-readable storage medium (also known as a computer-readable medium) on which is stored one or more sets of instructions or software embodying any one or more of the methodologies or functions described herein. The storage system 314 can have compute capabilities such as it can at least partly execute instructions residing the storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 304. The memory 310 can have compute capabilities such as it can at least partly execute instructions residing in the memory.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 4:
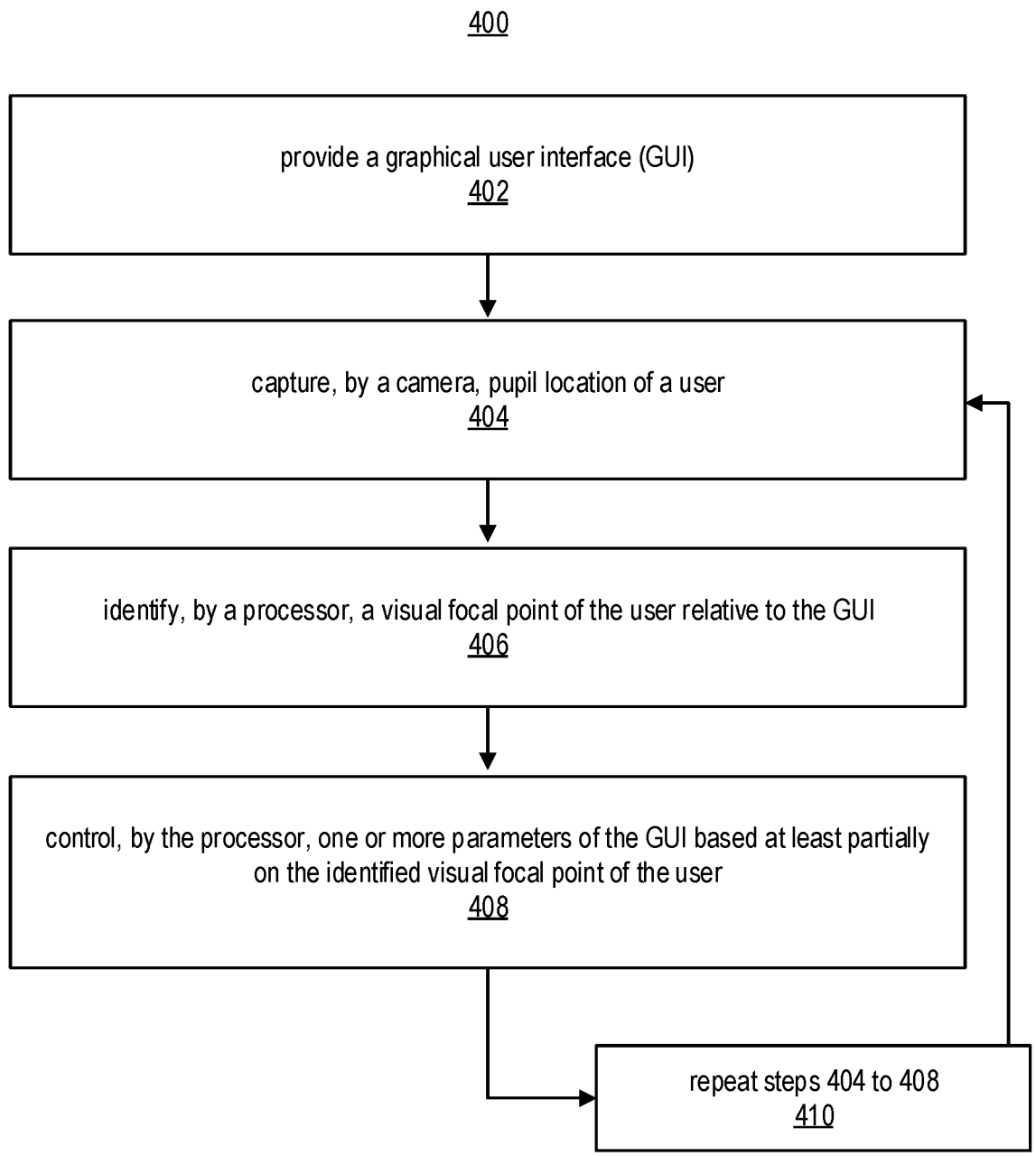
FIGS. 4 and 5 illustrate flow diagrams each having example operations that can be performed by aspects of the computing device depicted in FIG. 1, aspects of the networked system depicted in FIG. 2, or aspects of the networked system depicted in FIG. 3, in accordance with some embodiments of the present disclosure.
Figure 5:
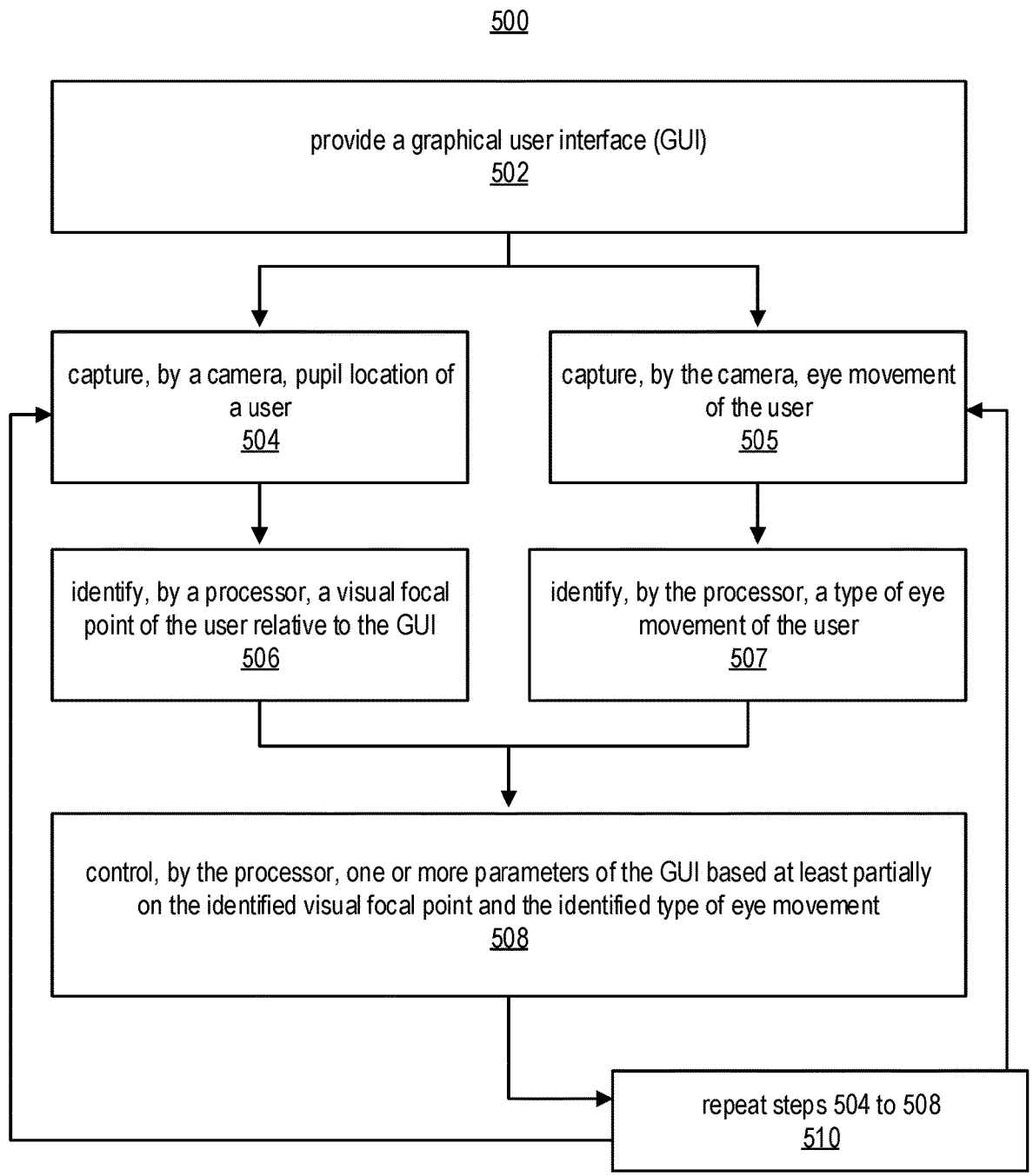

FIGS. 4 and 5 illustrate flow diagrams each having example methods 400 and 500 respectively that can be performed by aspects of the computing device 102 depicted in FIG. 1, aspects of the networked system 200 depicted in FIG. 2, or aspects of the networked system 300 depicted in FIG. 3, in accordance with some embodiments of the present disclosure.

In FIG. 4, the method 400 begins at step 402 with providing a GUI (e.g., see user interfaces 106 and 206 and other components 316). Step 402 can include providing a GUI as well as an auditory user interface, a tactile user interface, any other type of UI, or a combination thereof. The GUI can include and/or be provided by a processor and/or a user input/output component such as a display and/or a projected screen. Other user interface elements can include and/or be provided by the processor and/or a user input/output component such as a display, a projected screen, an audio output device such as speakers, and/or a tactile output device such as a vibrating device. The GUI and/or other user interface elements also can be provided by, connect to, or be a part of a wearable structure (e.g., see wearable structure 302).

At step 404, the method 400 continues with capturing, by a camera (e.g., see cameras 108 and 204 and other components 316), pupil location of a user. At step 404, the method can also continue with capturing, by the camera, locations of other parts of the eye. The camera can be connected to or be a part of the wearable structure (e.g., see wearable structures 302). The capturing of the pupil location can be relative to the GUI and/or one or more of the other user interface elements. It is to be understood that for this step and other related processes described herein, the capturing of the pupil location can be replaced or enhanced with capturing other aspects of an eye, such as iris or pupil size, eye shines, blood vessels of the eye, reflection of light from the eye, etc. Such other aspects of an eye captured may be useful during identification the visual focal point and/or the amount of attention to it. It is to be understood that for this step and other related processes described herein, the capturing of the pupil location can be replaced or enhanced with capturing other aspects of a face of a user that may be associated with associated with visual focal point and user interest in the focal point.

At step 406, the method 400 continues with identifying, by a processor (e.g., see processor and memory 104 and controller 308), a visual focal point of the user relative to the GUI. Alternatively, at step 406, the method 400 can continue with identifying, by a processor (e.g., see processor and memory 104 and controller 308), a visual focal point of the user relative to the GUI, a display, and/or another user interface. Step 406 can also include identifying, by the processor, the visual focal point of the user based at least partially on viewing angle and distance of at least one pupil of the user relative to the GUI, a display, and/or another user interface.

At step 408, the method 400 continues with controlling, by the processor, one or more parameters of the GUI based at least partially on the identified visual focal point of the user. Alternatively, at step 408, the method 400 can continue with controlling, by the processor, one or more parameters of a display, the GUI, another user interface, or a combination thereof based at least partially on the identified visual focal point of the user.

Step 408 can also include controlling skew or angle of output of the GUI and/or a display based at least partially on the identified visual focal point of the user. Step 408 can also include controlling distribution of screen resolution of the GUI and/or a display based at least partially on the identified visual focal point of the user. Step 408 can also include controlling distribution of screen coloring of the GUI or a display based at least partially on the identified visual focal point of the user. Step 408 can also include controlling distribution of screen brightness of the GUI or a display based at least partially on the identified visual focal point of the user. Step 408 can also include controlling distribution of screen shading of the GUI or a display based at least partially on the identified visual focal point of the user. Step 408 can also include controlling distribution of screen contrast of the GUI or a display based at least partially on the identified visual focal point of the user.

Also, the processor can be connected to or be a part of the wearable structure (e.g., see wearable structure 302).

At step 410, the method 400 repeats steps 404 to 408 until a particular action occurs, such as at least one of the GUI, the camera, the processor, or a combination thereof shuts off.

In some embodiments, it is to be understood that steps 404 to 408 can be implemented as a continuous process such as each step can run independently by monitoring input data, performing operations and outputting data to the subsequent step. Alternatively, steps 404 to 408 can be implemented as discrete-event process such as each step can be triggered on the events it is supposed to trigger and produce a certain output. It is to be also understood that FIG. 4 represents a minimal method within a possibly larger method of a computer system more complex than the ones presented partly in FIGS. 1 to 3. Thus, the steps depicted in FIG. 4 can be interleaved with other steps feeding in from and out to other steps associated with a larger method of a more complex system.

In FIG. 5, the method 500 begins at step 502 with providing a GUI (e.g., see user interfaces 106 and 206 and other components 316). Step 502 can include providing a GUI as well as an auditory user interface, a tactile user interface, any other type of UI, or a combination thereof. The GUI can include and/or be provided by a processor and/or a user input/output component such as a display and/or a projected screen. Other user interface elements can include and/or be provided by the processor and/or a user input/output component such as a display, a projected screen, a projection into user's retina, an audio output device such as speakers, and/or a tactile output device such as a vibrating device. The GUI and/or other user interface elements also can be provided by, connect to, or be a part of a wearable structure (e.g., see wearable structure 302).

At step 504, the method 500 continues with capturing, by a camera (e.g., see cameras 108 and 204 and other components 316), pupil location of a user. At step 504, the method can also continue with capturing, by the camera, locations of other parts of the eye. The camera can be connected to or be a part of the wearable structure (e.g., see wearable structures 302). The capturing of the pupil location can be relative to the GUI and/or one or more of the other user interface elements. It is to be understood that for this step and other related processes described herein, the capturing of the pupil location can be replaced or enhanced with capturing other aspects of an eye, such as iris or pupil size, eye shines, blood vessels of the eye, reflection of light from the eye, etc. Such other aspects of an eye captured may be useful during identification the visual focal point and/or the amount of attention to it. It is to be understood that for this step and other related processes described herein, the capturing of the pupil location can be replaced or enhanced with capturing other aspects of a face of a user that may be associated with associated with visual focal point and user interest in the focal point.

At step 505, the method 500 continues with capturing, by the camera, eye movement of the user. The eye movement can include at least one of eyebrow movement, eyelid movement, a saccade of an eye, a smooth pursuit movement of an eye, vergence movement of both eyes, or any other type of eye movement, or a combination thereof.

At step 506, the method 500 continues with identifying, by a processor (e.g., see processor and memory 104 and controller 308), a visual focal point of the user relative to the GUI. Alternatively, at step 506, the method 500 can continue with identifying, by a processor, a visual focal point of the user relative to the GUI, a display, and/or another user interface. Step 506 can also include identifying, by the processor, the visual focal point of the user based at least partially on viewing angle and distance of at least one pupil of the user relative to the GUI, a display, and/or another user interface.

At step 507, the method 500 continues with identifying, by the processor, a type of eye movement of the user. The type of eye movement of the user can be one or more eye gestures from the captured eye movement. Step 507 can include identifying one or more eye gestures at least in part from at least one of eyebrow movement, eyelid movement, or a combination thereof. Step 507 can include identifying one or more eye gestures at least in part from a captured saccade of the eye of the user. Step 507 can include identifying one or more eye gestures at least in part from a captured smooth pursuit movement of the eye of the user. Step 507 can include identifying one or more eye gestures at least in part from a captured vergence movement of both eyes of the user. In other words, step 507 can include identifying one or more eye gestures from the captured eye movement which can include identifying one or more eye gestures at least in part from eyebrow movement, eyelid movement, a saccade of an eye, a smooth pursuit movement of an eye, vergence movement of both eyes, or any other type of eye movement, or a combination thereof.

At step 508, the method 500 continues with controlling, by the processor, one or more parameters of the GUI based at least partially on the identified visual focal point of the user and the identified type of eye movement of the user (e.g., the identified one or more gestures of the user). Alternatively, at step 508, the method 500 can continue with controlling, by the processor, one or more parameters of a display, the GUI, another user interface, or a combination thereof based at least partially on the identified visual focal point of the user and the identified type of eye movement of the user (e.g., the identified one or more gestures of the user).

Step 508 can also include controlling skew or angle of output of the GUI and/or a display based at least partially on the identified visual focal point of the user and the identified type of eye movement of the user. Step 508 can also include controlling distribution of screen resolution of the GUI and/or a display based at least partially on the identified visual focal point of the user and the identified type of eye movement of the user. Step 508 can also include controlling distribution of screen coloring of the GUI or a display based at least partially on the identified visual focal point of the user and the identified type of eye movement of the user. Step 508 can also include controlling distribution of screen brightness of the GUI or a display based at least partially on the identified visual focal point of the user and the identified type of eye movement of the user. Step 508 can also include controlling distribution of screen shading of the GUI or a display based at least partially on the identified visual focal point of the user and the identified type of eye movement of the user. Step 508 can also include controlling distribution of screen contrast of the GUI or a display based at least partially on the identified visual focal point of the user and the identified type of eye movement of the user.

Also, step 508 can include controlling, by the processor, one or more parameters of the GUI based on the identified one or more eye gestures. Where the GUI can include, be a part of, or be a display, and step 508 can include increasing or decreasing brightness at least in a part of the display according to the identified one or more eye gestures. Also, step 508 can include increasing or decreasing at least one of contrast, resolution, or a combination thereof at least in a part of the display according to the identified one or more eye gestures. Also, step 508 can include activating or deactivating at least a part of the display according to the identified one or more eye gestures. Step 508 can also include dimming at least a part of the display when eyes of the user look away from the display. Step 508 can also include turning off the display when the eyes of the user look away from the display beyond a predetermined amount of time. The predetermined amount of time can be at least partially selectable by the user. Also, step 508 can include putting the computing device at least party in a power save mode when eyes of the user look away from the display beyond a predetermined amount of time. The predetermined amount of time relevant to power save mode selection and the degree of power savings can be selectable by the user.

Also, the processor can be connected to or be a part of the wearable structure (e.g., see wearable structure 302).

At step 510, the method 500 repeats steps 504 to 508 until a particular action occurs, such as at least one of the GUI, the camera, the processor, or a combination thereof shuts off.

In some embodiments, it is to be understood that steps 504 to 508 can be implemented as a continuous process such as each step can run independently by monitoring input data, performing operations and outputting data to the subsequent step. Alternatively, steps 504 to 508 can be implemented as discrete-event process such as each step can be triggered on the events it is supposed to trigger and produce a certain output. It is to be also understood that FIG. 5 represents a minimal method within a possibly larger method of a computer system more complex than the ones presented partly in FIGS. 1 to 3. Thus, the steps depicted in FIG. 5 can be interleaved with other steps feeding in from and out to other steps associated with a larger method of a more complex system. For example, in a case of a gaming system such as gaming console or a GPU card coupled with a PC, monitor and joystick or alike, the above method can be a part of graphics rendering pipeline, in which the enhancements described herein can be applied to enhancing gaming experience, rendered characters and textures, controlling the game, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
 a computing device;
 a display, the display connected to the computing device, the display configured to provide a graphical user interface (GUI);
 a camera connected to at least one of the computing device, the display, or a combination thereof, the camera configured to capture pupil location of a user; and
 a processor in the computing device, configured to:
  identify a visual focal point of the user relative to the GUI based on the captured pupil location and based at least partially on a viewing angle of at least one pupil of the user relative to the GUI;
  control one or more parameters of the display, the GUI, or a combination thereof based at least partially on the identified visual focal point of the user;
  control distribution of at least one of screen coloring, screen brightness, screen shading, or screen contrast of the display based at least partially on the identified visual focal point of the user; and
  control a parameter of an auditory user interface shown on the display and based at least partially on the identified visual focal point of the user.

2. The apparatus of claim 1, wherein the processor is further configured to identify the visual focal point of the user based at least partially on a distance of the at least one pupil of the user relative to the GUI.

3. The apparatus of claim 2, wherein the processor is configured to control skew or angle of output of the display based at least partially on the identified visual focal point of the user.

4. The apparatus of claim 2, wherein the processor is configured to control distribution of screen resolution of the display based at least partially on the identified visual focal point of the user.

5. The apparatus of claim 2, wherein the processor is configured to control distribution of screen coloring of the display based at least partially on the identified visual focal point of the user.

6. The apparatus of claim 2, wherein the processor is configured to control distribution of screen brightness of the display based at least partially on the identified visual focal point of the user.

7. The apparatus of claim 2, wherein the processor is configured to control distribution of screen shading of the display based at least partially on the identified visual focal point of the user.

8. The apparatus of claim 2, wherein the processor is configured to control distribution of screen contrast of the display based at least partially on the identified visual focal point of the user.

9. The apparatus of claim 1, wherein the camera is configured to:
capture eye movement of the user; and
wherein the processor is configured to:
identify a saccade based on the captured eye movement of the user; and
further control the one or more parameters of the display, the GUI, or a combination thereof based at least partially on the identified saccade.

10. The apparatus of claim 9, wherein the processor is configured to:
approximate eye movement of the user from one focal point to another focal point according to the identified saccade; and
further control the one or more parameters of the display, the GUI, or a combination thereof based at least partially on the identified approximated eye movement.

11. The apparatus of claim 9, wherein the processor is configured to further change skew or angle of output of the display based at least partially on the identified saccade.

12. The apparatus of claim 9, wherein the processor is configured to further non-uniformly distribute screen resolution of the display based at least partially on the identified saccade.

13. The apparatus of claim 9, wherein the processor is configured to further non-uniformly distribute coloring of the display based at least partially on the identified saccade.

14. The apparatus of claim 9, wherein the processor is configured to further non-uniformly distribute either brightness or shading of the display based at least partially on the identified saccade.

15. The apparatus of claim 9, wherein the processor is configured to further non-uniformly distribute contrast of the display based at least partially on the identified saccade.

16. The apparatus of claim 1, comprising a wearable structure, the wearable structure comprising or connected to at least one of the computing device, the display, the camera, or a combination thereof.

17. The apparatus of claim 16, wherein the wearable structure is configured to be worn on a head, around a neck, or around a wrist or forearm of the user.

18. The apparatus of claim 17, wherein the wearable structure comprises either a cap, a wristband, a neck strap, a necklace, or a contact lens.

19. An apparatus, comprising:
a computing device with a display configured to provide a graphical user interface (GUI);
a camera in or attached to the computing device, configured to capture pupil location and eye movement of a user; and
a processor in the computing device, configured to:
identify a visual focal point of the user relative to a screen of the display based on viewing angle and distance of at least one pupil of the user relative to the screen;
identify a saccade based on the captured eye movement of the user;
control one or more parameters of the display, the GUI, or a combination thereof based on the identified saccade, the identified visual focal point, or a combination thereof;
control distribution of at least one of screen coloring, screen brightness, screen shading, or screen contrast of the display based at least partially on the identified saccade, the identified visual focal point, or a combination thereof; and
control a parameter of an auditory user interface shown on the display and based at least partially on the identified visual focal point of the user.

20. An apparatus, comprising:
a computing device with a display configured to provide a graphical user interface (GUI);
a camera in or attached to the computing device, configured to capture pupil location and eye movement of a user; and
a processor in the computing device, configured to:
identify a visual focal point of the user relative to a screen of the display based on the captured pupil location and based at least partially on a viewing angle of at least one pupil of the user relative to the GUI;
identify a type of eye movement based on the captured eye movement of the user;
control one or more parameters of the display, the GUI, or a combination thereof based on the identified type of eye movement, the identified visual focal point, or a combination thereof;
control distribution of at least one of screen coloring, screen brightness, screen shading, or screen contrast of the display based at least partially on the identified type of eye movement, the identified visual focal point, or a combination thereof; and
control a parameter of a tactile user interface shown on the display and based at least partially on the identified visual focal point of the user.

21. The apparatus of claim 20, wherein the parameter of the tactile user interface comprises at least one of a pattern of vibration, strength of vibration, outputted temperature, or an outputted scent.

22. The apparatus of claim 1, wherein parameter of the auditory user interface comprises at least one of volume or playback speed.

* * * * *